United States Patent Office 2,791,597
Patented May 7, 1957

2,791,597
PROCESS FOR THE MANUFACTURE OF DICYCLOPENTADIENYLIRON

Willard F. Anzilotti, Carneys Point, and Victor Weinmayr, Pitman, N. J., assignors to E. I. du Pont de Nemours & Company, Wilmington, Del., a corporation of Delaware Application June 7, 1952, Serial No. 292,388

11 Claims. (Cl. 260—439)

This invention relates to a process for the manufacture of dicyclopentadienyliron from iron pentacarbonyl and cyclopentadiene. The product of this invention was discovered recently and may be represented by the formula:

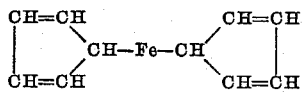

One method for its preparation is by the Grignard reaction between cyclopentadienyl magnesium bromide and anhydrous ferric chloride dissolved in anhydrous ether. While this process is satisfactory on a small scale, it is costly and presents a fire and explosion hazard which would be serious on a commercial plant scale.

Another method of preparing the product of the present invention involves reacting cyclopentadiene and a specially prepared iron catalyst. The main disadvantage with this process is that the catalyst loses its activity readily and becomes inoperable in a very short time.

It is therefore the object of the present invention to provide a process for preparing dicyclopentadienyliron adapted to commercial scale operation. Another object is the provision of a process which avoids the use of volatile, highly inflammable solvents. A further object is the provision of a method which produces satisfactory yields by a continuous commercial operation. A still further object is the provision of a method which may be carried out in readily available iron equipment. Other objects will appear as the description of the invention proceeds.

These and other objects are accomplished by reacting cyclopentadiene or its dimeric form, dicyclopentadiene, with iron pentacarbonyl. In one embodiment, stoichiometric amounts of the reactants are heated in a closed vessel under pressure at a temperature from about 220° to 500° C., the preferred range being from 250° to 400° C. An excess of either of the reactants is not detrimental to the process.

While cyclopentadiene and iron pentacarbonyl are both liquids and are miscible in all proportions, under some conditions miscible inert diluents or solvents such as benzene, octene-1 and others may be used. The reaction takes place readily without a catalyst, although if desired, one may be used but no significant changes in yield or quality have been observed in the final product by their use. The reaction time is very short and may vary from a few seconds in a continuous operation to several hours when carried out batch-wise.

While no particular theory is advanced as to the chemistry involved, evidence tends to show that the iron pentacarbonyl reacts with the cyclopentadiene with the formation of dicyclopentadienyliron, carbon monoxide and iron. The latter two appear to come from the decomposition of the iron pentacarbonyl. The stoichiometric proportions seem to indicate that one mol of iron pentacarbonyl reacts with two mols of cyclopentadiene. It will be noted that carbon monoxide and iron are part of the reaction products and are also used in the preparation of iron pentacarbonyl. It is therefore possible to reconvert these materials into one of the starting materials by a continuous process, thereby avoiding hazardous solvents and special catalysts, as shown in the discussion of Example V.

The following examples are given by way of illustration, and no limitation is intended in them except as defined in the appended claims, since the amounts of the reactants and the conditions of operation may vary considerably.

Example I

A steel pressure bomb was charged with 33 grams of cyclopentadiene, freshly distilled from dicyclopentadiene, and 49 grams technical iron pentacarbonyl. During a period of one hour the temperature was raised to 222° C. and a pressure of about 1000 lbs. was formed. After agitating at 220° to 230° C. for one hour, the temperature was raised to 300° C. and agitation was continued for two hours. A pressure of 1500 lbs. was recorded after that time. The bomb was then cooled, the pressure was released, and the reaction mass was washed out of it with benzene. There had been some bright yellow crystals on the walls of the bomb, and a reddish brown benzene solution containing some insoluble materials was obtained. Upon evaporation 32 grams of crude reaction product resulted. This crude product was slurried in 150 grams of high boiling petroleum ether (boiling range 115° to 125° C.) and the filtered solution was evaporated. Crude dicyclopentadienyliron (10 grams) was obtained, equal to a yield of 21.5%.

Upon sublimation pure dicyclopentadienyliron (M. P. 173° to 174° C.) was obtained as bright orange crystals. The product was identical with that prepared by the Grignard reaction according to Kealy and Pauson, Nature, 1951, 1040.

Analysis calculated for $C_{10}H_{10}Fe$: Fe, 30.0; C, 64.6; H, 5.4. Found: Fe, 29.95; C, 64.66; H, 5.38.

Example II

A charge of 33 grams cyclopentadiene, 49 grams iron pentacarbonyl, and 100 cc. thiophene-free benzene was heated to 275 C. for 4 hours. After cooling and venting the pressure which had risen to 1875 lbs., the red reaction mass was filtered and the insoluble residue was washed with benzene. This insoluble residue weighed 0.70 gram and was essentially inorganic iron. The benzene solution was concentrated on the steam bath until heavy crystallization of dicyclopentadienyliron set in. After cooling, the crystals were filtered, washed with petroleum ether and dried. The yield was 7 grams equal to 15% based on iron pentacarbonyl. An additional amount of dicyclopentadienyliron was obtained when the filtrate and wash was again concentrated.

Similar results were obtained when 55 cc. octene-1 was used instead of benzene.

Example III

A charge of 33 grams cyclopentadiene, 49 grams iron pentacarbonyl, and 3 grams of molybdenum trioxide was heated to 275° C. to 280° C. for 4 hours. The contents of the reactor were worked up as described in preceding experiments, and 9 grams of crude dicyclopentadienyliron was obtained.

Example IV

A steel vessel was charged with 33 grams dicyclopentadiene and 49 grams of iron pentacarbonyl. The temperature was raised to 275° C. in 45 minutes and maintained at 275° to 280° C. for 4 hours. A pressure of 1250 lbs. had developed. After cooling, the contents of the bomb were discharged and 15 grams of dicyclopentadienyliron was obtained from the crude product by sublimation at atmospheric pressure. This was equal to a yield of 30% of theory based on iron pentacarbonyl.

*Example V*

A glass tube was filled with glass beads and ceramic saddles to form a bed 10 inches high and ¾ inch in diameter. The tube was heated in a vertical position in an electric furnace. A thermometer reached about halfway into the tube. The top of the tube was connected to a dropping funnel and the bottom to a receiver which in turn was connected to an empty wash bottle, and a wash bottle containing benzene. The tube was heated to 350° to 400° C. A mixture of 33 grams of cyclopentadiene and 49 grams iron pentacarbonyl was put into the dropping funnel and allowed to drop into the hot tube fairly uniformly over a period of 30 minutes. A vigorous gas evolution took place and a yellow sublimate of dicyclopentadienyliron collected in the receiver, and in part was carried into the benzene scrubber where it formed a red-brown solution.

All receivers were washed out with benzene, the benzene solution was filtered, and the filtrate was evaporated. A very pure dicyclopentadienyliron (5.2 grams, 11.2%) was obtained without purification.

This continuous process may be adapted to large-scale operation by scrubbing the vapors from the reaction tube with benzene, for example by counter-current flow in a tower. Iron pentacarbonyl may be regenerated from the metallic iron deposited in the reaction tubes by passing carbon monoxide over it. In this form of the process, a plurality of reaction tubes is used, in some of which dicyclopentadienyliron is being formed at one stage and metallic iron deposited, while in the others the iron deposited in the preceding stage is converted to iron pentacarbonyl which is used, along with separately made iron pentacarbonyl, in the feed to the tubes in which the dicyclopentadienyliron is made.

Similar results were obtained at reaction temperatures of 250° or 300° C., and an addition time of 1½ hours. Technical dicyclopentadiene was used at 350° to 400° C. with equally good results.

It will be apparent from the above that a very simple process has been discovered for the preparation of dicyclopentadienyliron which is well adapted to commercial scale operations. The product of the invention is valuable in the preparation of fuels. It is also valuable as an anti-oxidant, a catalyst involving organo syntheses from carbon monoxide, a source of free organic radicals and a concentrated source of organic-soluble iron.

It will be apparent that many widely different embodiments of this invention may be made without departing from the spirit and scope thereof, and therefore it is not intended to be limited except as indicated in the appended claims.

We claim:

1. The process of preparing dicyclopentadienyliron which comprises heating a compound selected from the class consisting of cyclopentadiene and dicyclopentadiene with iron pentacarbonyl at a temperature between about 220° C. and 500° C.

2. The process of claim 1 in which the temperature is between 250° and 400° C.

3. The process of claim 1 in which the reaction is carried out in a closed vessel under pressure.

4. The process of claim 1 in which the reaction mass is diluted with an inert solvent.

5. The process of claim 1 in which the cyclopentadiene is in its dimeric form of dicyclopentadiene.

6. The process of claim 3 in which the pressure is from about 1000 to 1500 pounds per square inch.

7. The process of preparing dicyclopentadienyliron which comprises heating cyclopentadiene with iron pentacarbonyl at a temperature between about 220° and 500° C.

8. The process of preparing dicyclopentadienyliron which comprises mixing 33 parts of cyclopentadiene with 49 parts of technical iron carbonyl, raising the temperature to about 220° to 300° C. under a pressure of about 1000 to 1500 pounds per square inch, maintaining the temperature at the upper end of the temperature range for about 2 hours, cooling the reaction mass, and separating the yellow crystals of the dicyclopentadienyliron so formed.

9. The process of claim 1 in which the iron and carbon monoxide formed as reaction products are reacted to form iron carbonyl and returned to the process as a starting material.

10. A continuous process of preparing dicyclopentadienyliron which comprises heating a mixture of cyclopentadiene and iron pentacarbonyl at a temperature of 220° to 500° C. in a chamber provided with a scrubbing column, scrubbing the vapors from the reaction chamber with benzene, reacting the carbon monoxide and iron formed as by-products of the reaction to form iron pentacarbonyl, returning the same to the reaction chamber, and withdrawing dicyclopentadienyliron from the reaction mass.

11. The process of preparing dicyclopentadienyliron which comprises heating cyclopentadiene with iron pentacarbonyl at a temperature sufficient to bring about the desired reaction.

References Cited in the file of this patent
UNITED STATES PATENTS
2,409,167    Veltman _____ Oct. 8, 1946

OTHER REFERENCES

Kealy et al.: Nature, vol. 168, Dec. 15, 1951.
Miller et al.: Journal of the Chem. Soc. (London), February 1952, pp. 632–635.